United States Patent [19]

Augier et al.

[11] Patent Number: 5,218,208
[45] Date of Patent: Jun. 8, 1993

[54] DEVICE FOR MEASURING RADIOACTIVE CONTAMINATION OF A BODY

[75] Inventors: Patrick Augier; Paul-Henri Fouquet, both of Paris; Jean-Claude Chapuis, Igny; Maurice Chemtob, Creteil; Rene Chuiton, Clamart, all of France

[73] Assignees: L'Etat Francais; Commissariat a l'Energie Atomique, both of France

[21] Appl. No.: 804,757

[22] Filed: Dec. 11, 1991

[30] Foreign Application Priority Data

Dec. 11, 1990 [FR] France ................. 90 15485

[51] Int. Cl.⁵ .................................. G01T 1/167
[52] U.S. Cl. ...................... 250/363.02; 250/363.01; 250/370.06; 250/370.11
[58] Field of Search ............ 250/370.11, 370.06, 250/363.01, 363.02

[56] References Cited

U.S. PATENT DOCUMENTS

| | | | |
|---|---|---|---|
| 4,536,841 | 8/1985 | Waechter et al. | 364/413.26 |
| 4,649,276 | 3/1987 | Suzuki | 250/361 R |
| 5,057,690 | 10/1991 | Morgan et al. | 250/336.1 |

FOREIGN PATENT DOCUMENTS 2480443 10/1981 France ................. 250/370.11

OTHER PUBLICATIONS

G. A. Petrillo, R. J. McIntyre, R. Lecomte, G. Lamoureux and D. Schmitt, "Scintillation Detection with Large-Area Reach-Through Avalanche Photodiodes". *IEEE Transactons on Nuclear Science*, vol. NS-31, No. 1 Feb. 1984) pp. 417-423.

K. Kandiah, A. J. Smith and G. White, "A Pulse Processor for X-Ray Spectrometry with Si(Li)-Detectors." *IEEE Transactions on Nuclear Science*, vol. NS-22, No. 5 (Oct. 1975) pp. 2058-2065.

Dale G. Olson and Michael S. Cole, "On-Line Quantitative Gamma Spectrometry with Computerized Data Reduction." *Analytical Chemistry*, vol. 47, No. 1 (Jan. 1975) pp. 75-79.

*Primary Examiner*—Constantine Hannaher
*Attorney, Agent, or Firm*—Oliff & Berridge

[57] ABSTRACT

A device for measuring radioactive contamination of a body includes a scintillator crystal (1) sensitive to gamma radiation emitted during disintegration of the radioactive elements (I, Cs, Co) contaminating a body to which the end of scintillator (1) is applied. A photodiode (2) converts the photons generated in scintillator (1) by the gamma radiation into electric charges. A mechanism (3, 7) converts these charges into amplified, frequency-filtered voltage pulses. Pulse counts in a plurality of bands and deconvolution effected by an electronic mechanism (8) built into the device allow measurement of the contamination of the body by each of the radioactive elements in question.

17 Claims, 1 Drawing Sheet

DEVICE FOR MEASURING RADIOACTIVE CONTAMINATION OF A BODY

BACKGROUND OF THE INVENTION

The present invention relates to a device for measuring radioactive contamination of a body such as a food product and, in particular, to a device of this kind proceeding from the gamma radiation resulting from disintegration of one or more radioactive elements that have contaminated the body.

Devices are known that can measure separately the various types of radiation, alpha, beta, and gamma, coming from radioactive contaminants in order to detect and reject food products whose contamination level is such that ingestion of these products by human beings could be hazardous thereto. Although these devices perform their function properly, their sensitivity to gamma radiation is often inadequate.

A device for measuring gamma activity manufactured by the Berthold Company (Germany) and sold under the name "Becquerel-Monitor LB 200" is also known. This device comprises a sodium iodide crystal scintillator associated with a photomultiplier which requires a high-voltage power supply. Such a power supply is expensive, heavy, and bulky, and hence not portable. In addition, the device uses product samples that must be destroyed by grinding to prepare them for measurement.

SUMMARY OF THE INVENTION

The goal of the present invention is to provide a device for measuring the contamination, by radioactive elements, of a body such as a food product, that does not have these drawbacks and is hence easy to use, light, and small, and hence portable, with a self-contained power supply using commercial batteries, sturdy, and inexpensive to manufacture so that it is accessible to the general public. Such a device is very useful particularly in the case of a large-scale nuclear accident because it then enables a large number of persons to ensure the harmlessness of any possibly contaminated food item, directly and on the spot, because of the portable nature of the device.

Another goal of the present invention is to make a device of this kind which leaves intact the products subjected to measurement.

These goals of the invention, together with others which will emerge from reading the specification hereinbelow, are achieved with a device for measuring radioactive contamination of a body that uses the gamma particles emitted by at least one radioactive element, of the type having a scintillator sensitive to these gamma particles and emitting photons in response. According to the invention, the device comprises:

a) a photodiode designed to collect said photons emitted by the scintillator and convert them into electrical charges, b) means for converting said charges into electrical pulses, c) a voltage amplifier connected to the output of the photodiode to deliver pulses whose amplitude is proportional to the energy of the gamma particles detected by the scintillator, d) means for classifying the pulses into several predetermined energy bands and counting the pulses received in each band for a preset time interval, and e) means for calculating from these counts the contamination of the body by said radioactive element.

The use in the device according to the invention of a photodiode of a particular type which will be described in greater detail hereinbelow allows one to dispense with a photomultiplier sensitive to variations in the electromagnetic field, along with its expensive, heavy, and bulky power supply.

By classifying the pulses into several predetermined energy bands, simplified spectrometry may be performed on these pulses by counting the pulses in these bands.

According to another characteristic of the device according to the invention, the calculation means include means for deconvoluting the counts made and thus separately measuring the contamination of said body due to each radioactive element of a plurality of such elements such as iodine, cobalt, and cesium. These are the elements often found in products contaminated by radioactive substances.

According to yet another characteristic of the device according to the invention, it comprises means for displaying the contamination of a body placed in front of the scintillator, radioactive element by radioactive element.

The device also comprises means for selecting parameters for calculating the contamination of a particular body presented in front of the scintillator so that the contamination of the body can be displayed in becquerels per unit mass or per unit volume of the contaminated body. Means are provided for comparing the calculated contaminations to threshold values, whereby audible or visual alarm means are triggered when at least one of these thresholds in memory is exceeded.

The device is supplied electrically by batteries accommodated in a handle which allows the device to be carried easily.

BRIEF DESCRIPTION OF THE DRAWINGS

Other characteristics and advantages of the device according to the present invention will emerge from reading the following description and examining the attached drawing wherein.

DETAILED DESCRIPTION OF PREFERRED EMBODIMENTS

Figure 1:
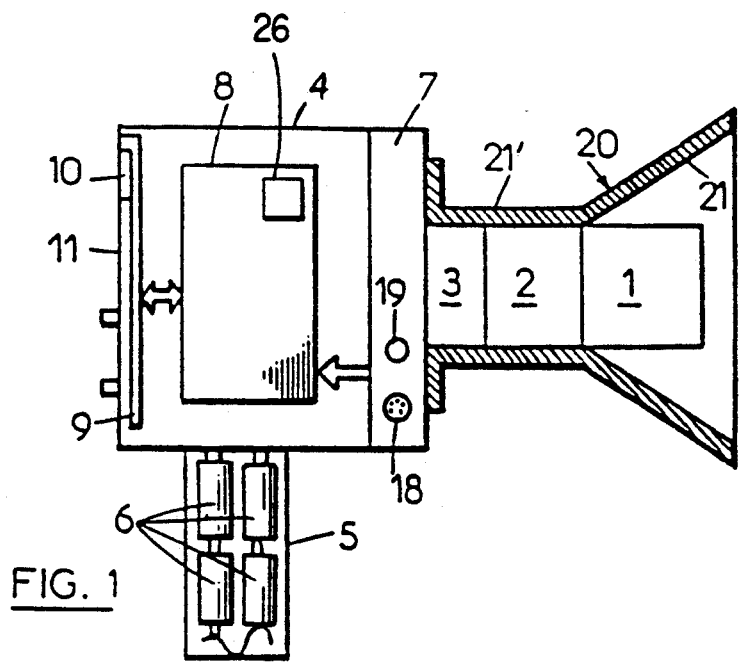
FIG. 1 is a side elevational view in partial cross-section of the device according to the invention.

Reference will be made to FIG. 1 of the attached diagram which shows that this device has the general shape of a camera comprising, instead of the lens, a gamma radiation detector composed of a scintillator 1 joined, according to the invention, to a photodiode 2 itself associated with a preamplifier 3, this assembly (1, 2, 3) being placed in front of a housing 4 provided with a handle 5 for carrying the device. Advantageously, according to the invention, electric batteries are preferably accommodated in handle 5 to ensure independent powering of the device.

Housing 4 contains a voltage amplifier 7, preferably shielded and supplied with pulses delivered by preamplifier 3, whereby the output of the amplifier supplies one or more electronic boards 8 which, according to the invention, have means for powering these boards, means for shaping the pulses delivered by the amplifier, means for classifying and counting these pulses, and calculation means analyzing these counts to obtain information on possible contamination by one or more radioactive elements of a body presented to the scintillator. The device is completed by a board 9 for controlling a screen 10 on which said information is displayed.

Figure 2:
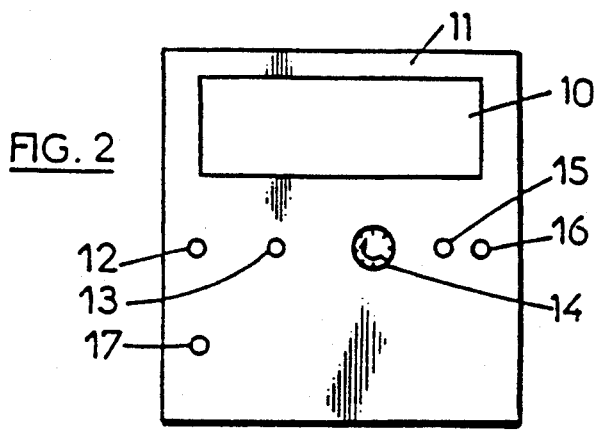
FIG. 2 is a diagram of a control and display panel provided at the rear of the housing of the device in FIG. 1.

FIG. 2 shows the rear 11 of housing 4 on which are located, in addition to screen 10 mentioned above, several elements needed for controlling the device. These include a pushbutton 12 which controls the electric power supply to the device (on/off button), a pushbutton 13 to command the measurement of background noise, a rotary selector switch 14 which can be moved to several angular positions each of which is associated with the nature of a body subjected to measurement, light-emitting diodes 15, 16, and a pushbutton 17 to start the acquisition of counts, all of which will be described in greater detail hereinbelow. Optionally, the device may be supplemented (see FIG. 1) by a connector 18 to connect the output of amplifier 7 with a laboratory spectrometer and by a button 19 for controlling the gain of the amplifier, for purposes that will also be explained in the remainder of the present specification.

According to one particular embodiment of the invention, provided solely as an example, detector 1 takes the form of a scintillator composed of a cesium iodide crystal custom-cut and sold by the Harsaw, Quartz & Silice Holland Company (Netherlands). This crystal may be large, about 7 cm$^3$ for example, and is joined on one of its faces to a photodiode 2 with a large sensitive surface (approximately 3 cm$^2$ for example) such as the photodiode sold by the Hamamatsu Company (Japan) under number S 3204-03. The above-mentioned Harsaw Company also supplies scintillator crystal 1, photodiode 2, and a preamplifier 3 which preamplifies the signal delivered by the photodiode, in one unit constituting a detector usable in the invention.

The output signal from preamplifier 3 is supplied to amplifier 7 which, according to the invention, is a voltage amplifier with a narrow passband. This band is adapted to the scintillator and optimizes the signal-to-noise ratio.

Reference will be made to the functional diagram of the device according to the invention shown in FIG. 3 for a more detailed explanation of the treatment and processing of the output signals from amplifier 7 by electronic means provided on boards 8. From the material standpoint, these means include essentially a microprocessor and associated memories 26, this microprocessor being properly programmed to perform the calculations required for the radioactive contamination measurements to be made and to control both the detection by the unit of the signals emitted by the photodiode and the display of the measurements obtained or the excitation of the display means such as light-emitting diode 15 or alarm means such as diode 16.

The device according to the invention is designed to be carried individually by a large number of persons located in a zone contaminated with radioactive products. The goal of these persons would then be to monitor the radioactivity of various bodies such as foods, for example, before deciding whether to consume them. For this purpose, the end of the detector (1, 2, 3) of the device is applied to one surface of the product under test, a lettuce for example, through a protective bag preventing the device from being contaminated. The gamma radiation resulting from contamination of the product with the radioactive element passing through the contact surface is then picked up by scintillator crystal 1 of the detector where its radiation interacts with the crystal to produce a cascade of ionizations and excitations which cause light photons to be emitted and picked up by photodiode 2. The latter converts this emission into an electric charge, which is then converted into a voltage pulse by preamplifier 3. The pulse amplitude is proportional to the light energy emitted by the interaction of each gamma particle with the scintillator medium.

It will incidentally be noted (in FIG. 1) that the device is equipped with a screen 20 which has a conical end part 21 and a cylindrical part 21' for attaching this screen, possibly removably, to detector (1, 2, 3). Screen 20 protects scintillator crystal 1 from background gamma radiation and serves as a shield against the electromagnetic fields created by electronic means 8. Its conical part 21 also delimits a fixed solid angle in which backscattering occurs, increasing detection sensitivity.

Figure 3:
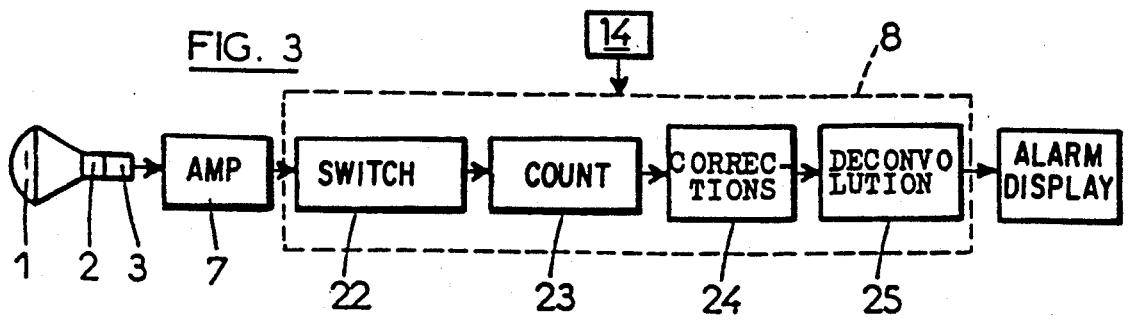
FIG. 3 is a functional diagram useful in comprehending the operation of the device according to the invention.

Reference will once more be made to FIG. 3 to describe and explain the functions carried out by the electronics on board 8. The voltage pulses delivered by preamplifier 3, filtered as indicated above and amplified by narrow-band amplifier 7, are processed by means 22 which classify these voltage pulses according to their amplitude into one or more of several energy bands chosen so as to allow separation by deconvolution of the respective contributions of several radioactive elements, iodine, cesium, and cobalt, for example, in the generation of the voltage pulses delivered by the amplifier.

It is known that the $dN/dE = f(E)$ spectrum, whereby dN is the number of pulses in the interval dE and E is the pulse energy, for a radiation of given energy, has, in addition to a hump due to the Compton effect, a peak due to the photoelectric effect, characteristic of the energy of the gamma particle considered. When the energy bands mentioned above are chosen such as to isolate these peaks, pulse counts in these bands will allow the portion of this count due to this third radioactive element to be determined, based on the known contributions of two of the three radioactive elements (I, Cs, Co) in the number of pulses counted in the peak band of the third. It is thus possible to deduce the contamination due to the third radioactive element in the body under test with the device according to the invention. One thus operates with each radioactive element to calculate the contamination of the body by the three radioactive elements.

In addition to the classification means, the electronic means of the device include means 23 able to count, during a preset time controlled by the microprocessor, the pulses classified into predetermined energy bands. As a nonlimiting example, the counts are made in the following bands:

a broad band covering all the others (from 135 to 1500 keV), a band corresponding to the cesium peak (about 661 keV), a band corresponding to the cobalt peaks (around 1250 kev), a band corresponding to the iodine peak (around 360 keV).

The counts made are processed in means 24 that correct for "dead time" and classic background noise.

From the four corrected counts, deconvolution means 25 calculate the contamination of the body under test by each of the radioactive elements detected.

In practice, the device according to the invention operates as follows. When the device has been switched on with pushbutton 12, button 13 is pressed to measure the background noise, which is entered into memory. It is only after this has been entered into memory that the front surface of scintillator 1, forming part of detector (1, 2, 3), is applied to the body under test. Using selector 14, one then displays the nature of this body, a lettuce in the example mentioned above. This selection loads correction parameters into the calculation means which allow these means to deduce contamination of the lettuce in becquerels/kg from the measurements and calculations performed. Similar measurements could be made in becquerels/liter, for milk bottles for example.

The operator then presses button 17 to start acquisition of the four counts mentioned above for a period of time measured by the microprocessor, 100 seconds for example. Diode 15 then lights up to signify this acquisition. The four counts are temporarily stored in memory, corrected as indicated above, and subjected to calculations determining the total contamination of the lettuce and its contamination, radioactive element by radioactive element. These measurements are displayed on screen 10. When these contaminations exceed preset thresholds, comparison means built into the calculation means cause the message "CONTAMINATED" to appear on screen 10 and visual alarm diode 16 to light up. Of course this alarm could be replaced or supplemented by an audible alarm.

Because of the counts performed as described above, the device according to the invention performs a type of simplified spectrometry which reduces the size of the necessary electronics. If it is desired to check in the laboratory using a classic spectrometer, the measurements performed by the device, amplifier output 7 can be plugged into the spectrometer through connector 18.

The device according to the invention lends itself to the use of interchangeable detectors (1, 2, 3) for better adaptation to a given application. Since the characteristics of these detectors may be different, the gain of the amplifier is adjusted using button 19, depending on the detector chosen.

As has been seen above, protective screen 20 may be removable. In fact, there exists a standard bottle developed by the French Atomic Energy Commission, called the GTN5, designed to contain products to be subjected to radioactive contamination measurements. This bottle, which has a given volume, allows rigorous comparative measurements. The bottle has a recess into which a detector such as the device according to the invention for example may be inserted. Screen 20 must be removed for this insertion.

It now appears that the device according to the invention allows all the goals to be achieved since it is inexpensive to manufacture, easy to use, has a self-contained power supply, is light and small and hence highly portable, and sturdy. These characteristics and advantages make it a device particularly but not exclusively intended for the general public.

Of course the invention is not limited to the embodiment shown, given as an example only. Thus, instead of the cesium iodide scintillator crystal, a sodium iodide crystal scintillator for example, or another detector, could be used.

What is claimed is:

1. A hand-held device for measuring the radioactive contamination of a body, using gamma particles emitted by at least one radioactive element, having a scintillation detector sensitive to gamma particles which emits photons in response, comprising:
   a photodiode designed to collect the photons emitted by the scintillator and convert them into electrical charges;
   a converter for converting the electrical charges into electric pulses;
   a voltage amplifier connected to the converter to deliver voltage pulses with an amplitude proportional to the energy of the gama particles detected by the scintillator;
   a classifier for classifying the voltage pulses into several predetermined energy bands and counting the voltage pulses received in each band for a predetermined period of time; and
   a calculator to calculate, from these counts, the contamination of the body by the radioactive element, wherein said scintillator, photodiode, converter, voltage amplifier, classifier and calculator are disposed in close proximity to one another such that said device is a single, self-contained hand-held unit.

2. A device according to claim 1, wherein the calculator includes a deconvoluter for deconvoluting the counts and thus separately measuring the contamination of the body by each radioactive element of a plurality of radioactive elements.

3. A device according to claim 2, wherein the deconvoluter separates the contaminations of the body by radioactive elements from the group consisting of iodine, cobalt, and cesium.

4. A device according to claim 3, further comprising a display mechanism for displaying the contamination of the body placed in front of the scintillator by individual radioactive elements.

5. A device according to claim 4, further comprising a selector for selecting parameters to calculate the contamination of the body presented in front of the scintillator in order to display the contamination of the body in becquerels per unit mass or unit volume of the contaminated body.

6. A device according to claim 5, further comprising a memory for storing contamination thresholds, a comparing mechanism for comparing the calculated contaminations to these thresholds, and an audible or visual alarm mechanism which is triggered when at least one of the thresholds in memory is exceeded.

7. A device according to claim 2, wherein the calculator includes a correcting mechanism for correcting for dead time and background noise.

8. A device according to claim 1, wherein the scintillator comprises a cut crystal of cesium iodide or sodium iodide.

9. A device according to claim 1, wherein the photodiode has an extensive surface area.

10. A device according to claim 1, wherein the converter comprises a preamplifier associated with the photodiode.

11. A device according to claim 10, wherein an assembly of the scintillator, the photodiode and the preamplifier forms a replaceable detector and the amplifier is fitted with an adjuster for adjusting the gain to adapt the amplifier to the detector installed in the device.

12. A device according to claim 1, wherein the voltage amplifier is of the narrow passband type to optimize the signal-to-noise ratio.

13. A device according to claim 1, wherein the calculator includes a microprocessor loaded with calculation programs, said microprocessor also being programmed to generate the counting times.

14. A device according to claim 1, further comprising a connector for connecting the amplifier output to a spectrometer external to the device.

15. A device according to claim 1, wherein said voltage amplifier, said classifier and said calculator are disposed within a common housing, said scintillator, said photodiode and said converter being attached to said housing.

16. A device according to claim 15, further comprising a screen attached to said housing to protect the scintillator against background radiation and other sources of radiation that might interfere with the measurements, the screen being removably mounted around the scintillator to allow a measuring bottle of the GTN5 type to be mounted on the scintillator.

17. A device according to claim 15, said device being powered by batteries accommodated in a handle coupled to said housing.

* * * * *